United States Patent [19]

Heina

[11] Patent Number: 4,528,899

[45] Date of Patent: Jul. 16, 1985

[54] TRAY SUPPORT FOR OVEN REELS

[76] Inventor: Karl Heina, 624-A Cobblestone Cir., Glenview, Ill. 60025

[21] Appl. No.: 615,747

[22] Filed: May 31, 1984

[51] Int. Cl.³ .............................................. A47J 37/04
[52] U.S. Cl. ...................... 99/427; 384/276; 403/162
[58] Field of Search ................ 99/427, 443 R, 443 C; 403/162; 384/276, 299, 300

[56] References Cited
U.S. PATENT DOCUMENTS

| 1,603,022 | 10/1926 | Briney | 384/296 X |
| 2,964,341 | 12/1960 | Doyle et al. | 384/299 X |
| 3,193,335 | 7/1965 | Wing | 384/296 |
| 3,333,529 | 8/1967 | Wilson | 99/427 X |
| 3,504,620 | 4/1970 | Gerhardt | 99/427 |
| 3,665,840 | 5/1972 | Horany | 99/443 X |

Primary Examiner—Billy J. Wilhite

[57] ABSTRACT

Replaceable support assemblies for cooking trays for rotating oven reels that include a replaceable bearing structure that permit free movement between the cooking trays and the rotating oven reel while supporting thereon articles to be cooked during the rotation of the reel.

8 Claims, 3 Drawing Figures

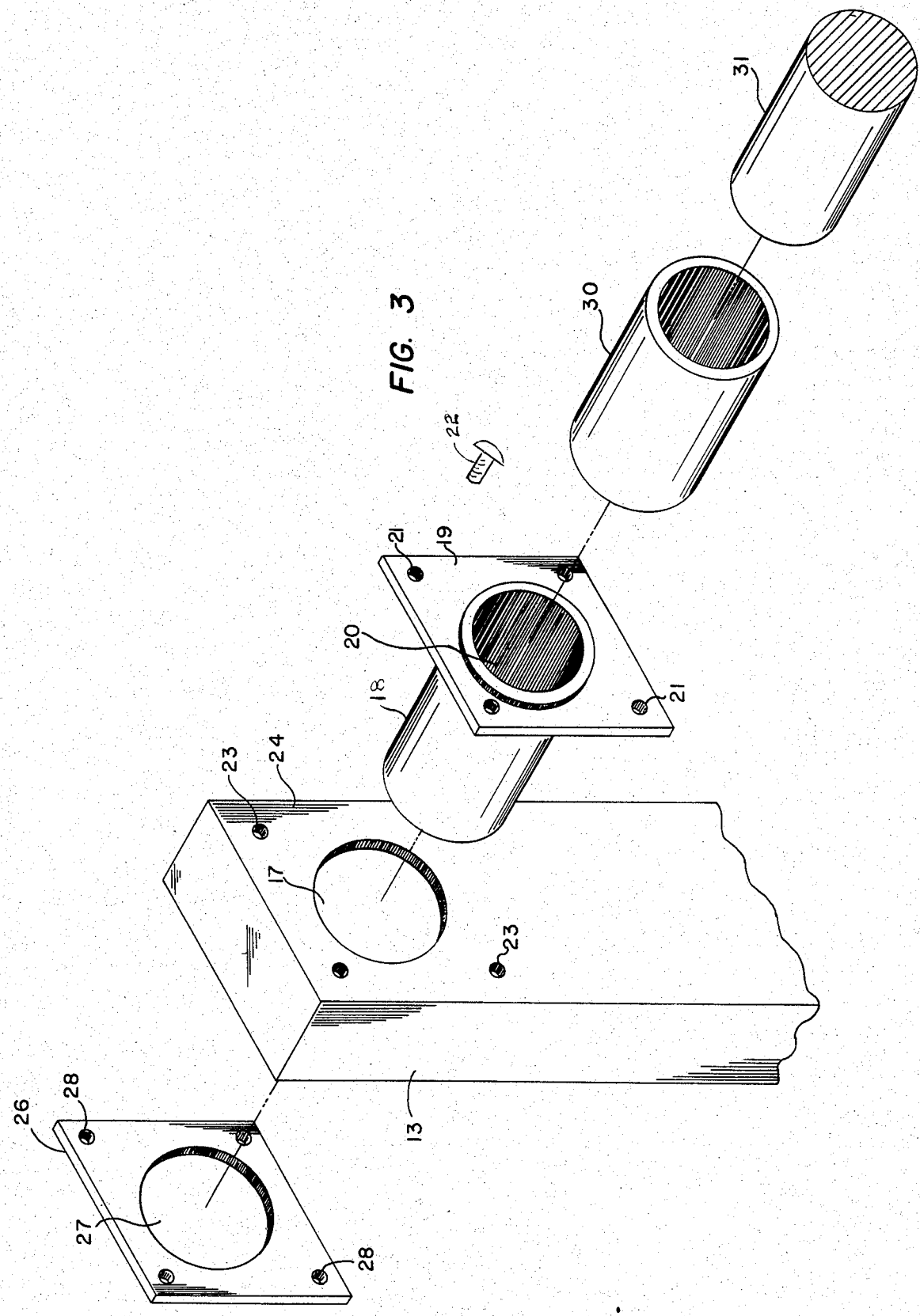

TRAY SUPPORT FOR OVEN REELS

SUMMARY

The present invention is adapted to be utilized in cooking ovens that include internal rotating reels which consist of a pair of spaced apart spider assemblies including a central hub and a plurality of radially extending spokes. Between the spokes of each spider assembly are position cooking trays supported by a shaft that is in turn journalled in replaceable bearings.

It is an object of the present invention to provide support assemblies for the cooking trays of an oven reel which are simple in manufacture and easily and readily replaceable. The need for ready replacement of the bearing structures is by reason of the fact that the supports for the cooking trays that rely upon the bearing structures for free rotatable movement are subject to extreme variations of heat during the cooking period of the oven, which adversely affect their longevity.

A more specific object of the invention is to provide in an oven reel, spider assemblies, which consist of metalic hollow spokes, that permit ready assembly and replacement of tray supporting structures thus greatly reducing the down time for such ovens.

Other objects and advantages of the invention will be here and after made apparent.

BRIEF DESCRIPTIONS OF THE DRAWINGS

The invention will be best understood by reference to the accompanying drawings which illustrate the preferred construction by which the objects of the invention are achieved and in which.

GENERAL DESCRIPTION

Figure 1:
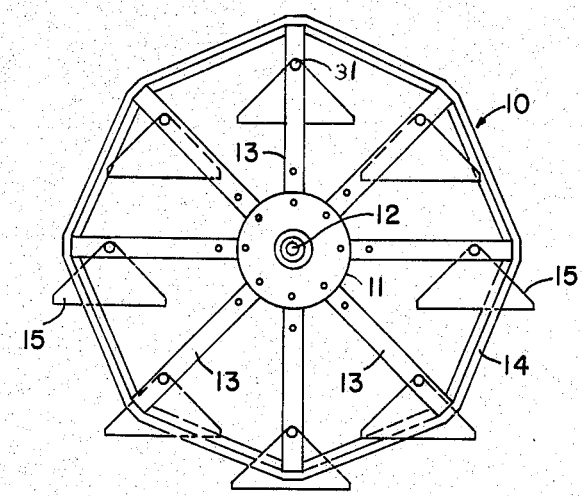
FIG. 1 is a side elevational view of a cooking tray oven reel of the type associated with the present invention.
Figure 2:
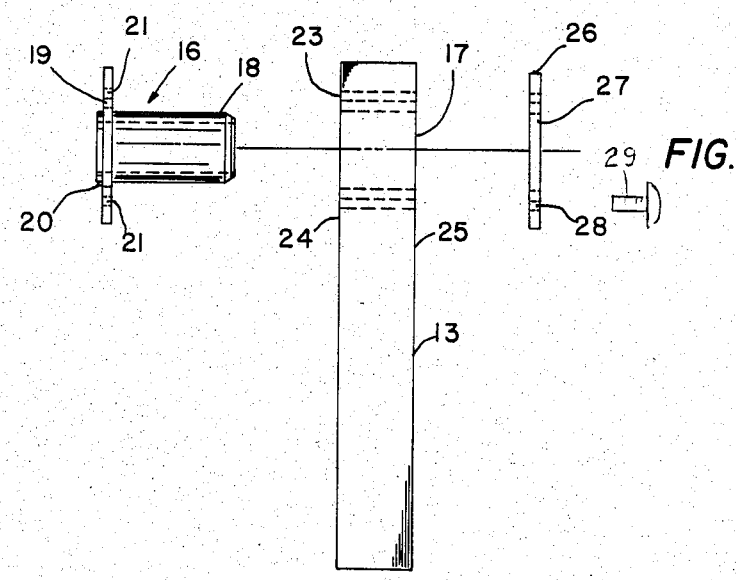
FIG. 2 is a side elevational view of a single spoke arrangement including in an exploded relation the replaceable bearing structure of the present invention and, FIG. 3 is a fragmentary enlarged perspective view of the present invention in an exploded relation.

There is illustrated in the drawings a oven reel 10 which consists of a spider construction which in turn provides a central hub 11 mounted upon a shaft 12. Radially extending from the hub 11 are a plurality of spokes 13 which have their free ends connected together by support members 14.

It should be borne mind that the reel 10 consists of 2 identical spider structures spaced apart so that they may support there between cooking trays 15.

As shown in FIG. 1 as the reel 10 rotates with the shaft 12 the trays are freely supported between the spider structures so that they maintain a horizontal disposition at all times.

To accomplish the free rotatable movement of the trays 15 each spoke 13 is provided with a replaceable bearing 16.

The spoke 13 have formed therein a circular opening 17 which is of a size to readily receive the cylindrically shaped bearing body 18 of the bearing 16.

As shown in FIG. 3 the cylindrical body 18 of the bearing 16 has fixedly attached thereto at one end a supporting plate 19, this plate 19 is provided with a center opening 20 of a size to receive therein the body 18 of the bearing 16. The plate 19 is also provided with apertures 21 which are adapted to receive threaded connectors 22 which will also be threadibly received in corresponding apertures 23 formed in one wall 24 of the spoke 13.

It should be noted that the cylindrical body 18 of the bearing 16 is of a slightly longer length than the thickness of the spoke 13 so as to extend outwardly of either end of the opening 17.

When the cylindrical body 18 is inserted into the opening 17 formed in the spoke 13 and the plate 19 is in facial abutment with the wall 24, the opposite free end of the cylindrical bearing body 18 will project beyond the opposite wall 25 of the spoke 13.

To this projecting end of the bearing body 18 is mounted a second supporting plate 26 which Provides a center opening 27 of a of a size conforming to the diameter of the bearing body 18. The second plate 26 also provides apertures 28 for the reception of suitable threaded connectors 29.

Within the cylindrical bearing body 18 there if frictionally fitted a bushing 30 that is adapted to support the connecting rods 31 which extend between the juxtapositioned bearing 16 provided by spaced apart related spokes 13 that in turn supports a tray 15.

The replaceable bearing body 18 permits the oven reel to be readily repaired thus reducing the down time for the entire operation. In the prior machines of this type the shaft support for the trays were subject to extreme temperature variations which produced abnormal wear rendering the entire oven inoperable.

By the present construction the bearing body 18 may be individually removed from its supporting spoke 13 by merely releasing the supporting plates 19 and 26. The worn or damaged bushing 30 can be readily replaced in the bearing body 18 thus permitting the re-use of undamaged parts.

While I have illustrated and described the preferred form of construction for carrying my into effect, this capable of variation and modification without departing from the spirit of the invention. I, therefore, do not wish to be limited to the precise details of construction as set forth, but desire to avail myself of such variations and modification as come within the scope of the appended claims.

Having thus described my invention what I claim as new and desire to protect by Letters Patent is:

1. A replaceable tray support assembly for an oven reel including a spider structure having a central hub supporting a plurality of radially extending spokes, wherein the improvement comprises;
   (a) said spokes being arranged in parallel sets with each spoke of search set having formed therein a circular opening adjacent one end,
   (b) a bearing mounted in said circular opening of each of said spokes adapted to receive a tray supporting shaft therein,
   (c) said bearing providing a cylindrical body adapted to house a bushing member,
   (d) a tubular bushing member mounted in said bearing,
   (e) a retaining plate integral with said bearing adjacent one end thereof and adapted to be secured to said spoke for securing said bearing in said circular opening formed in said spoke,
   (f) means for securing said plate to said spoke,
   (g) a second plate having a central opening embracing the opposite end of said bearing as it extends beyond said spoke for securing said bearing structure in said circular opening form in said spoke, (h) and means for attaching said second plate to said spoke.

2. A replaceable tray support assembly for an oven reel as defined by claim 1 wherein said bearing is of a length greater than the width of said spoke and of sufficient length to extend through said opening formed in said second plate so as to be supported thereby.

3. A replaceable tray support assembly for an oven reel as defined by claim 1 wherein said means for securing and attaching said mounting plate and said second plate to said spoke comprises screws threadable into apertures formed in said spoke adjacent to said circular opening formed therein.

4. A replaceable tray support assembly for an oven reel as defined by claim 3 wherein said bearing is of a length greater than the width of said spoke and of sufficient length to extend through said opening formed in said second plate so as to be supported thereby.

5. A replaceable tray support assembly for an oven reel as defined by claim 4 wherein said bushing is of a length substantially equal to said bearing and adapted to be secured therein during placement and removal of said bearing from said spoke.

6. A replaceable tray support assembly for oven reel as defined by claim 1 wherein said bushing is of a length substantially equal to said bearing and adapted to be secured therein during placement and removal of said bearing from said spoke.

7. A replaceable tray support assembly for an oven reel as defined by claim 6 wherein said bearing is of a length greater than the width of said spoke and of sufficient length to extend through said opening formed in said second plate so as to be supported thereby.

8. A replaceable tray support assembly for an oven reel as defined by claim 6 wherein said means for securing and attaching said mounting plate and said second plate to said spoke comprises screws threadable into apertures formed in said spoke adjacent to said circular opening formed therein.

* * * * *